(12) United States Patent
Nicosia

(10) Patent No.: US 10,947,456 B2
(45) Date of Patent: Mar. 16, 2021

(54) SYSTEMS FOR THE EXTRACTION OF BITUMEN FROM OIL SAND MATERIAL

(71) Applicant: Vivakor, Inc., Las Vegas, NV (US)

(72) Inventor: Matt Nicosia, Vineyard, UT (US)

(73) Assignee: Vivakor, Inc., Las Vegas, NV (US)

( * ) Notice: Subject to any disclaimer, the term of this patent is extended or adjusted under 35 U.S.C. 154(b) by 33 days.

(21) Appl. No.: 16/177,210

(22) Filed: Oct. 31, 2018

(65) Prior Publication Data

US 2019/0194547 A1 Jun. 27, 2019

Related U.S. Application Data

(60) Provisional application No. 62/579,882, filed on Oct. 31, 2017.

(51) Int. Cl.
| | |
|---|---|
| C10G 1/04 | (2006.01) |
| B01D 5/00 | (2006.01) |
| C10G 31/10 | (2006.01) |
| C10G 1/00 | (2006.01) |

(52) U.S. Cl.
CPC ............ *C10G 1/045* (2013.01); *B01D 5/006* (2013.01); *B01D 5/0024* (2013.01); *C10G 1/00* (2013.01); *C10G 31/10* (2013.01); *C10G 2300/1033* (2013.01); *C10G 2300/206* (2013.01); *C10G 2300/208* (2013.01)

(58) Field of Classification Search
None
See application file for complete search history.

(56) References Cited

U.S. PATENT DOCUMENTS

| | | |
|---|---|---|
| 4,455,216 A | 6/1984 | Angevine et al. |
| 9,321,967 B2 | 4/2016 | Filby et al. |
| 2008/0277318 A1 | 11/2008 | Bozak et al. |
| 2010/0236991 A1 | 9/2010 | Hastings |
| 2011/0127198 A1 | 6/2011 | Siy et al. |
| 2012/0152809 A1 | 6/2012 | Kift et al. |
| 2013/0026077 A1* | 1/2013 | Joshi .................. C10G 1/045 208/390 |
| 2013/0256092 A1 | 10/2013 | Podlipskiy |
| 2018/0346819 A1 | 12/2018 | Nicosia et al. |

* cited by examiner

*Primary Examiner* — Derek N Mueller

(74) *Attorney, Agent, or Firm* — Kirton McConkie; Brian Tucker

(57) ABSTRACT

A system and method for separating bitumen from oil sands material is disclosed. The method may include mixing the oil sands material with a solvent in a mix tank then passing it through a centrifuge. The method may also include drying the clean oil sands material and recovering the vapors through a condenser unit. The system may further include passing the mixture of bitumen and solvent through a flash evaporator to produce pure bitumen or leaving it mixed with the higher API hydrocarbon condensate for the production of crude oil.

30 Claims, 9 Drawing Sheets

SYSTEMS FOR THE EXTRACTION OF BITUMEN FROM OIL SAND MATERIAL

CROSS-REFERENCE TO RELATED APPLICATIONS

This application claims the benefit of U.S. provisional patent application No. 62/579,882 filed Oct. 31, 2017.

STATEMENT REGARDING FEDERALLY SPONSORED RESEARCH OR DEVELOPMENT

Not Applicable.

BACKGROUND

1. The Field of the Present Disclosure

This disclosure is particularly directed towards a method of obtaining bitumen. Specifically, this invention is directed towards a method for extracting bitumen from oil sand material.

2. Description of the Related Art

Rystad Energy, a Norwegian consulting firm, estimates that the world has about 2,092 billion barrels of recoverable petroleum reserves. Since the beginning of recorded history, some 1,300 billion barrels of oil have been produced world wide. At the current production rate of 30 billion barrels per year, that supply will be exhausted in about 70 years. However, the current production rate is likely to increase dramatically with the number of petroleum-powered vehicles on the road expected to double from 1 billion to 2 billion over the next 30 years. While there is still a lot of oil left in the world to be recovered, according to this estimate, most of it is of unconventional varieties. Rystad estimates that the U.S. has the largest petroleum reserves of any nation on earth. Estimated to be equivalent to about 264 billion barrels of oil, more than half of that amount in the form of kerogen, an "immature oil" found in oil shale deposits. Kerogen, a mixture or organic chemical components that make up a portion of the organic matter in sedimentary rocks such as carbonate or marlstone, is insoluble in normal organic solvents because of the high molecular weight of its component compounds. The soluble portion of organic matter in the rock is known as bitumen. Kerogen is a mixture of organic chemical compounds that make up a portion of the organic matter in sedimentary rocks, such as carbonate or marlstone. Kerogen must undergo a form of upgrading (e.g. retorting) wherein this solid form of elemental hydrocarbon is heated to approximately 370° C. to remove excess nitrogen and complete its conversion to a liquid hydrocarbon. Retorted kerogen from oil shale is suitable for refining into numerous high value products including diesel fuel, jet fuel and gasoline.

About an eighth of total world petroleum reserves is in the form of tar sands. Tar sands (also referred to as oil sands) are a combination of clay, sand, water, and bitumen—a sticky, black and highly-viscous or semi-solid form of petroleum that is also known as asphalt. In some cases, such as many tar sands in Venezuela, the hydrocarbon constituent in tar sands is extra-heavy crude, rather than bitumen.

Hydrocarbons are classified by API (American Petroleum Institute) gravity. This is a measure of how heavy or light a hydrocarbon liquid is. API gravity is the specific gravity of a hydrocarbon liquid. Bitumen has an API gravity of less than 10, (API<10), while various grades of crude oil have higher specific gravity, with "light" crude oil having an API approximately higher than 30.

While tar sands are found in many places worldwide, the largest deposits in the world are located in Alberta, Canada (176.8 billion barrels), the Orinoco Belt in Venezuela (235 billion barrels), and much of the rest is found in various countries in the Middle East. In the United States, tar sands resources are primarily concentrated, mostly on federal public lands, in Eastern Utah. The in-place tar sands oil resources in Utah deemed recoverable are estimated to contain the equivalent of 12 to 19 billion barrels of oil. All such reserves, as well as others, have a need for improved recovery.

Currently, oil is not produced from tar sands on a significant commercial level in the United States; In fact, only Canada has a large-scale commercial tar sands industry, though a small amount of oil from tar sands is produced commercially in Venezuela. The Canadian tar sands industry in Alberta produces more than one million barrels of synthetic oil per day. Currently, tar sands represent about forty percent of Canada's oil production, and output is expanding rapidly. Approximately twenty percent of U.S. crude oil and products come from Canada, and a substantial portion of this amount comes from tar sands.

The bitumen in tar sands cannot be pumped from the ground in its natural state; Instead tar sand deposits are mined, usually using strip mining or open pit techniques, or the oil is extracted by underground heating with additional upgrading. Although after processing, the oil from tar sands is similar to oil pumped from conventional oil wells, extraction of oil from tar sands is much more complex than conventional oil recovery. Oil sands recovery processes include extraction and separation systems to separate the bitumen from the clay, sand, and water that make up the tar sands. Like kerogen, bitumen also requires additional upgrading before it can be refined. Because it is so viscous (thick), it also requires dilution with lighter hydrocarbons to make it transportable by pipelines.

Methods introduced in the 1990s considerably improved the efficiency of tar sands mining, thus reducing the cost. These systems use large hydraulic and electrically powered shovels to dig up tar sands and load them into enormous trucks that can carry up to 320 tons of tar sands per load.

There are two different types of tar sands: "oil-wetted" tar sands and "water-wetted" tar sands. The Canadian tar sands that have been successfully exploited are water-wetted tar sands. They have water contents typically in the 3-5% range. Oil wetted tar sands have the bitumen trapped within the pore spaces of the host sandstone, adhering directly to the sand grains without the presence of an intervening film of water (known as connate water).

Currently, the Clark process is utilized in Canada to extract the bitumen from water-wetted tar sands. After mining, these tar sands are transported to an extraction plant, where a hot water process separates the bitumen from sand, water, and minerals. The separation takes place in separation cells. Hot water is added to the sand, and the resulting slurry is piped to the extraction plant where it is agitated. The combination of hot water and agitation releases bitumen from the oil sand, and causes tiny air bubbles to attach to the bitumen droplets, that float to the top of the separation vessel, where the bitumen can be skimmed off. Further processing removes residual water and solids. The bitumen is then transported and eventually upgraded into synthetic crude oil. Alberta tar sands contain an average of about ten percent bitumen by weight. About two tons of tar sands are required to produce one barrel of oil from tar sands in Alberta, Canada. Using the Clark process, roughly 75% of the bitumen can be recovered from sand. After oil extraction, the spent sand and other materials are then returned to the mine, which is eventually reclaimed.

Processes other than the Clark process can be used to extract bitumen from water-wetted tar sands which are buried too deep for economical mining operations. This includes using in-situ production methods such as steam injection, solvent injection, and firefloods, in which oxygen is injected and part of the resource burned to provide heat. To date, steam injection is the favored method. Some of these methods require large amounts of both water and energy.

Variants of the Clark process have also been tried in extracting bitumen from oil-wetted tar sands. However, as oil-wetted tar sands lack connate water, these attempts have met with failure or limited success due to the Clark process's reliance on connate water.

To date, oil-wetted tar sands can be processed by treating them with an organic solvent that dissolves the tar, which is then recovered as a straight bitumen product. However, this solvent process has proved to be commercially unviable for three reasons. The first reason is the high cost of the organic solvents, which are not completely recoverable. The second reason is that the recovered bitumen must be subjected to a cracking process, which adds to processing costs, and results in a reduction of recoverable hydrocarbons. The third reason is that the sands from which the hydrocarbon compounds were extracted become an environmental catastrophe. When the extraction process involves the use of a solvent, and any hydrocarbons from either the extraction solvent or the tar, itself, remain in the final sand product, it is likely to be subject to the provisions of the U.S. Resource Conservation and Recovery Act (RCRA), a federal law promulgated by the U.S. Environmental Protection Agency (EPA), in accordance with a U.S. Congressional mandate, that establishes the framework for the proper management of hazardous and non-hazardous solid waste.

In view of the disadvantages and shortcomings of existing methods, a new process is needed for extracting bitumen from both oil-wetted and water-wetted tar sands where the majority of the solvent is recoverable and which will leave the final sand and clay product virtually bitumen free, and will produce hydrocarbon products that can be used, if desired, without additional cracking and refining.

In addition, hydrocarbons can often be spilled and it is an expensive process to clean them and remove them from these materials. An improved process which allows near complete removal of hydrocarbons from environmental material would be a valuable addition to the state of the art of cleaning hydrocarbon spills.

BRIEF DESCRIPTION OF THE DRAWINGS

Reference will now be made to the accompanying drawings, wherein.

DETAILED DESCRIPTION

Figure 1:
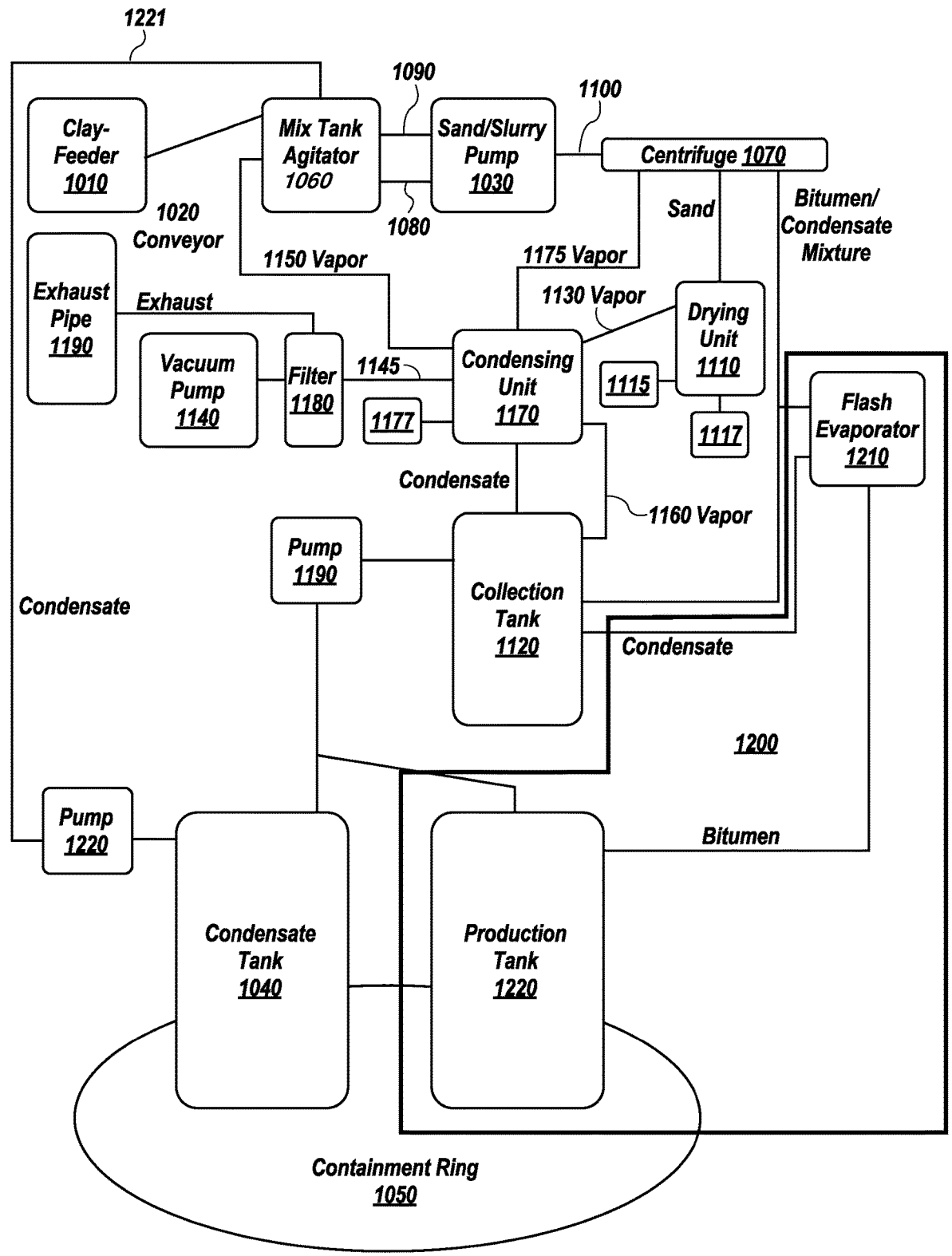
FIG. 1 is a block diagram of the system for extracting bitumen from oil sands.

For the purposes of promoting an understanding of the principles in accordance with the disclosure, reference will now be made to the embodiments described herein and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure and the subject matter claimed.

Before the present process and system is disclosed and described, it is to be understood that this disclosure is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present disclosure will be limited only by the appended claims and equivalents thereof.

It must be noted that, as used in this specification and the appended claims, the singular forms "a," "an," and "the" include plural referents unless the context clearly dictates otherwise.

In describing and claiming the present disclosure, the following terminology will be used in accordance with the definitions set out below.

As used herein, the terms "comprising," "including," "containing," "characterized by," and grammatical equivalents thereof are inclusive or open-ended terms that do not exclude additional, un-recited elements or method steps.

Furthermore though this specification is written towards the removal of bitumen from oil sands material, the process and apparatus described can also be used to extract hydrocarbons from the environment in a wide variety of situations, as will become apparent to those skilled in the art. This includes the removal of hydrocarbons from material which have become contaminated by them, for example. When used to clean up contaminated materials, oil sands material in the process is replaced with contaminated materials. In addition, bitumen is only one example of a hydrocarbon which can be removed using this process. Other hydrocarbons can be extracted and either used (when the process is used in mining), or properly disposed of (when the process is used to clean up contaminated materials).

This disclosure describes a system and a process for extracting bitumen from oil sands material. This system effectively and efficiently extracts bitumen from oil sands material. This process involves mixing the oil sand material with a hydrocarbon condensate in a mix tank with an agitator, then sending the resulting slurry through a centrifuge, which results in a bitumen/condensate mixture and clean sands (less than 1% Petroleum Hydrocarbons). The bitumen/condensate mixture can then be stored and used in the production of crude oil, or it can be passed through a flash evaporator to separate the condensate from the bitumen. The sand can be passed through a drying unit, removing additional hydrocarbons as vapors. Vapors from throughout the entire process can be collected and passed through a condensing unit and then collected as part of the bitumen/condensate mixture.

An example of a system and method for extracting bitumen from oil sands material according to the present disclosure will now be described in detail, with reference to the drawings. It is to be understood that the following is merely one example of the system disclosed herein, as various alternatives will be discussed at each step of the process. While the steps of the process will be grouped and discussed together for ease of understanding, the various potential embodiments of the presently disclosed process will be understood to those of ordinary skill in the art.

One embodiment of the invention is a system for extracting bitumen from oil sands material, as shown by the block diagram in FIG. 1. The system will be described in the order in which the steps of the illustrative method take place. The system includes a clay feeder 1010 (also represented as 610 in FIG. 6), which in some embodiments has a grizzly bar or other apparatus for filtering out material by size on the top 620. What size material should be removed varies depending upon the embodiment, but in one illustrative embodiment material with a diameter larger than one inch is removed. The clay feeder can have rotary blades that will force the material out to one side and ultimately drop it onto a conveyor 1020 (also 630).

The conveyor 1020 represented in FIG. 1 is controlled by a central electrical panel (represented in FIG. 3), and in one illustrative embodiment has a variable frequency drive that can vary the speed of the motor, thus allowing control of the flow of material onto the conveyor. In another illustrative embodiment, the conveyor also includes or is a weigh belt, as known to those of skill in the art, that weighs the material as it is traveling along the conveyor. The weigh belt is connected to a display (represented in FIG. 4), which allows the operator to observe the data about the material.

Figure 7:
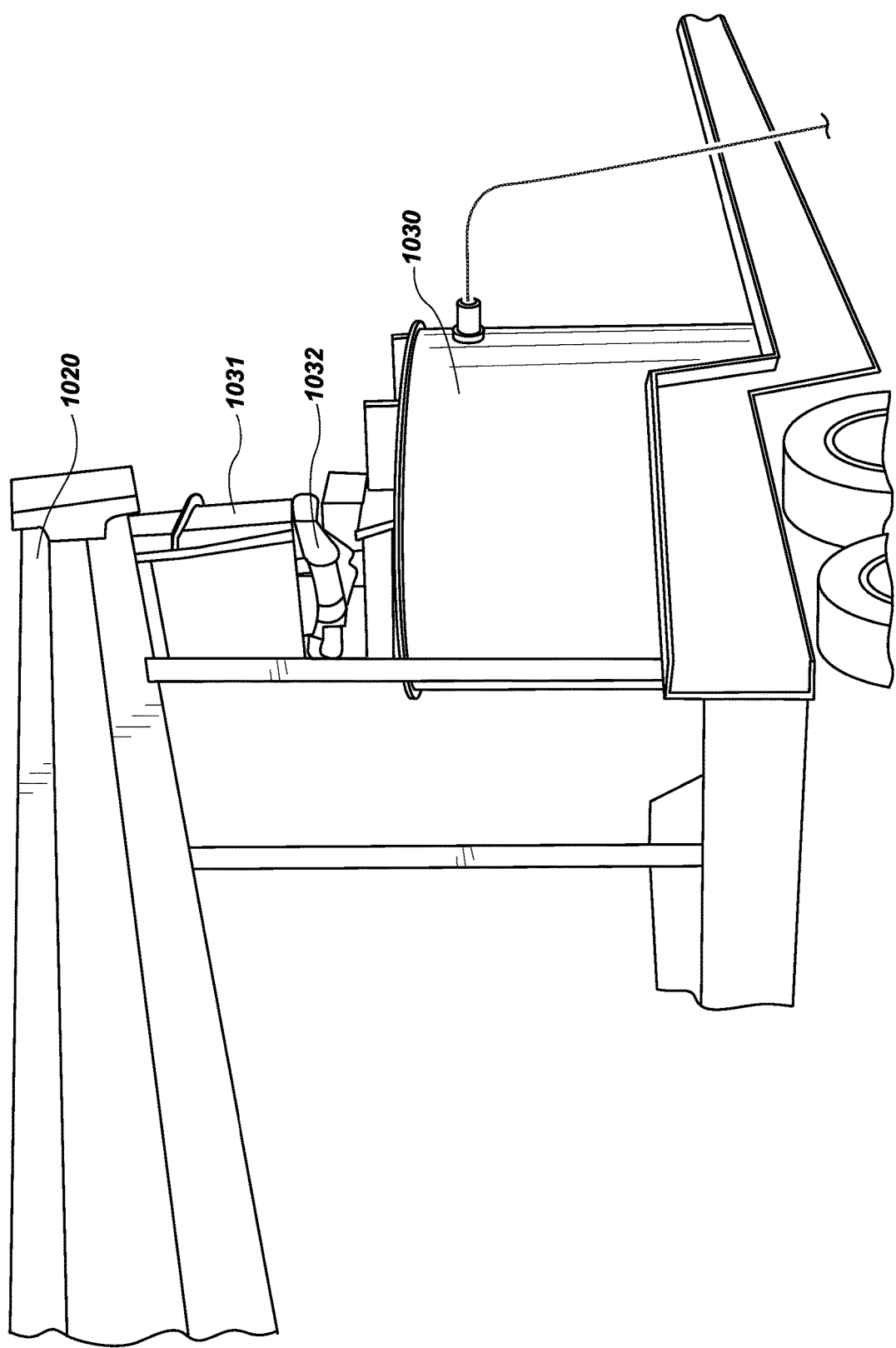
FIG. 7 is a view of the illustrative mix tank showing the conveyor belt leading to it.

The conveyor 1020 represented in FIG. 1 transports the crushed material between the clay feeder 1010 and a mix tank 1030 (represented in FIG. 7), with a hopper 1031 mounted on it. The hopper 1031 receives the crushed material and is positioned so that the top portion makes light contact with the conveyor belt 1020 as it passes, preventing any material from sticking to the belt and traveling along the underside. In one illustrative embodiment the hopper is connected to the mix tank by a rotary valve 1032, which is one method for allowing material into the mix tank 1030 while preventing air inflow into the mix tank 1030, but other methods may be used.

Figure 5:
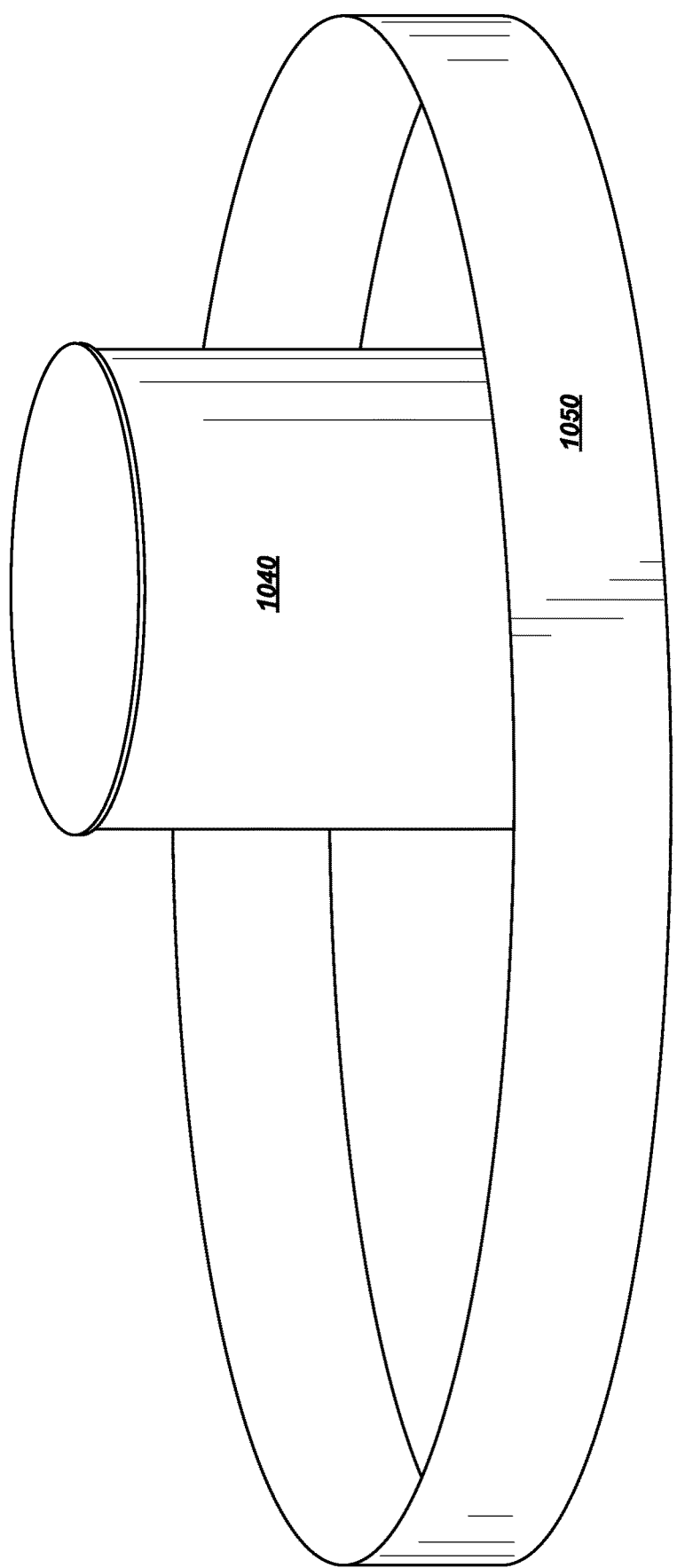
FIG. 5 is a perspective view of an illustrative hydrocarbon tank, partially showing a containment ring.

In the mix tank 1030 represented in FIG. 1 the oil sands material is mixed with a hydrocarbon solvent. The mix tank 1030, also includes an agitator within (not shown) which agitates the mixture of oil sands material and hydrocarbon solvent, ensuring that it is thoroughly mixed and continuously in motion. The agitator can be a mechanical agitator consisting of, for example, a number of stirring blades attached to a shaft which spins, thus stirring the mixture and keeping it in motion. The agitator is controlled by the central panel represented in FIG. 3. In addition, in one illustrative embodiment the mix tank has a series of float switches (not explicitly represented) which detect when the level of material in the mix tank is low. When the level is low, the switches activate a pump 1220 that introduces more solvent into the mix tank through a hose line 1221. In one illustrative embodiment of the invention, the solvent is introduced from a hydrocarbon tank 1040, that is situated nearby within a containment ring 1050 (also shown in FIG. 5). The process works with the temperature in the mix tank 1030 between about 40 degrees Fahrenheit and about 130 degrees Fahrenheit, with a preferred temperature of about 120 degrees Fahrenheit. It is within the mix tank 1030 that hydrocarbons are separated from the oil sands material, resulting in a slurry of oil sands material mixed with bitumen and a condensate of higher API hydrocarbons.

In one embodiment of the system, a high-powered sand pump 1060, also referred to as a slurry pump 1060, as represented in FIG. 1, is connected to the mix tank and a centrifuge 1070. A main hose line 1080, which attaches to the mix tank about 22 inches from the bottom, is connected to the pump 1060 and centrifuge 1070. In addition, there is a bypass or secondary line 1090 leading from the top of the sand pump and back into the top of the mix tank to accommodate any overflowing or back pressure from the centrifuge line. Another hose line 1100 leads from the sand pump 1060 to the centrifuge 1070. The sand pump 1060 has a variable drive connected to it which is controlled from the main panel (represented in FIG. 3) and can vary the speed of the motor and the rate of flow. In addition, there is a hose or line 1150 from near the top of the mix tank to collect vapors, which line is connected to a condenser unit 1170. The sand pump 1060 pumps the slurry of sand and bitumen/condensate mix into the centrifuge 1070.

The centrifuge 1070 (also represented in FIG. 8), is connected to a cylindrical drying unit 1110, and a collection tank 1120. The slurry goes through the centrifuge which separates the sand and the mixture of bitumen and condensate of higher API hydrocarbons. The cylindrical drying unit 1110 and collection tank 1120 are connected to the centrifuge 1070 in such a way that after being separated, the sand can travel into the drying unit 1110 and the bitumen mixed with condensate goes into the collection tank 1120. In one illustrative embodiment the collection tank 1120 also has a line 1160 to catch vapors near the top, which is connected to the condensing unit 1170. The collection tank may be located on a level lower than the centrifuge so as to be gravity-fed. In addition, a hose line 1175 may be connected to the centrifuge 1070 and the condensing unit 1170 to catch vapors from the centrifuge and return them to the condensing unit.

The cylindrical drying unit 1110 has a series of rotary blades inside and in one illustrative embodiment is heated by an Electrical Heat Tracing System 1115 to between approximately 150 degrees Fahrenheit and 300 degrees Fahrenheit. The Electrical Heat Tracing System has two individual 230 VAC 60 Hz. circuits. The rotary blades in the drying unit turn the sands over and ultimately deposit the clean sand into a spoils pile 1117. In one illustrative embodiment there is a hose 1130 placed at the top end of the drying unit 1110. Continuous suction is created in the hose lines (1130, 1150, 1160, 1175) connected to a vacuum pump 1140, which causes the condensate vapors to enter the hose lines.

Figure 9:
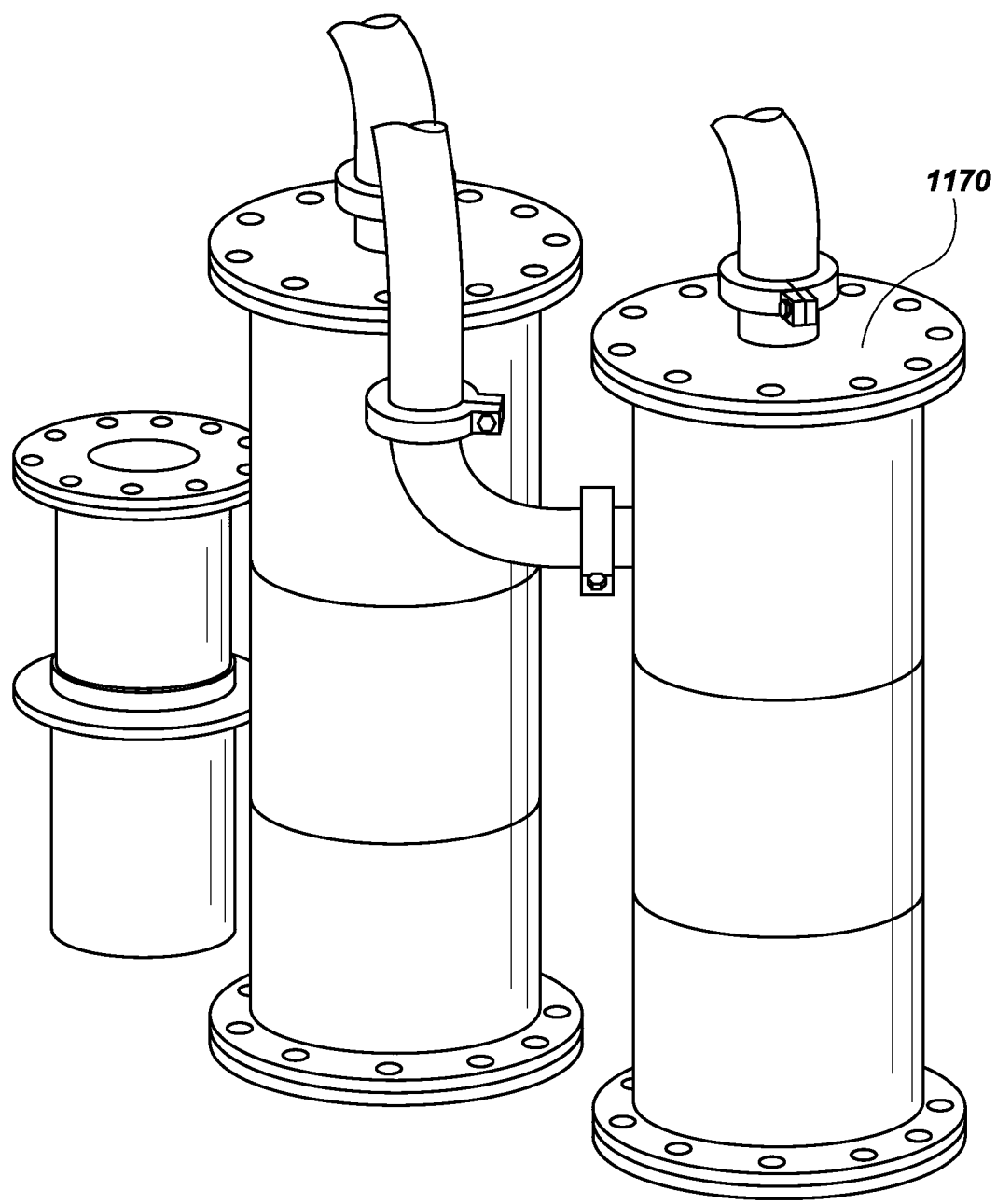
FIG. 9 is a view of an illustrative condensing unit.

The drying unit, the mix tank, the centrifuge, and the collection tank may all be connected to the condensing unit 1170 (also represented in FIG. 9), via hoses positioned and designed to catch vapors in the system 1130, 1150, 1160, 1175. The vacuum pump 1140 creates suction in the hose lines and draws the vapors into the condensing unit 1170. The condensing unit is connected to a water chiller 1177 which cools it. The condensing unit 1170 is also connected to the collection tank 1120. The vapors which condense into liquid in the condensing unit 1170 flow into the collection tank 1120. Also provided is an exhaust pipe 1190 connected to the charcoal screen filter 1180, through which exhaust exits the system.

In one illustrative embodiment, the collection tank 1120 has a series of float switches installed which sense when the liquids reach a certain level and automatically activate a pump 1190. The pump 1190 pumps liquid from the collection tank to the hydrocarbon tank 1040 within the containment ring 1050 (also represented in FIG. 5). In one illustrative embodiment the hydrocarbon tank has a capacity of about 400 barrels. This can be the same hydrocarbon tank from which solvent is pumped to mix with the oil sands material in the mix tank 1030, thus the condensate can be re-used as solvent in the system.

In another illustrative embodiment 1200, shown in FIG. 1, the centrifuge 1070 is connected to a flash evaporator 1210. The flash evaporator is designed to take the mixture of bitumen and higher API hydrocarbons and crack out any materials with a high API (approximately greater than 50 API) from the bitumen. The higher API hydrocarbons are fed into a separate collection from the collection tank off the centrifuge and are then fed into the hydrocarbon tank 1040 within the containment ring 1050. The bitumen is fed into a production tank 1220 within the containment ring 1050, where it is maintained at a proper temperature to be stored or transported.

In view of the foregoing, it will be appreciated that the present disclosure provides an improved system for extracting bitumen from oil sands material. The different embodiments of the system can used to make either a mixture of bitumen and higher API condensate, which can be used to produce crude oil, or it can separate bitumen from the condensate, as for an asphalt binder. As will be appreciated by those of ordinary skill in the art, this system improves the production bitumen or crude oil from oil sands material by providing a novel and efficient method for doing so. The method in the current disclosure provides an improvement by providing an efficient system for extracting bitumen when used according to the method below.

Figure 2:
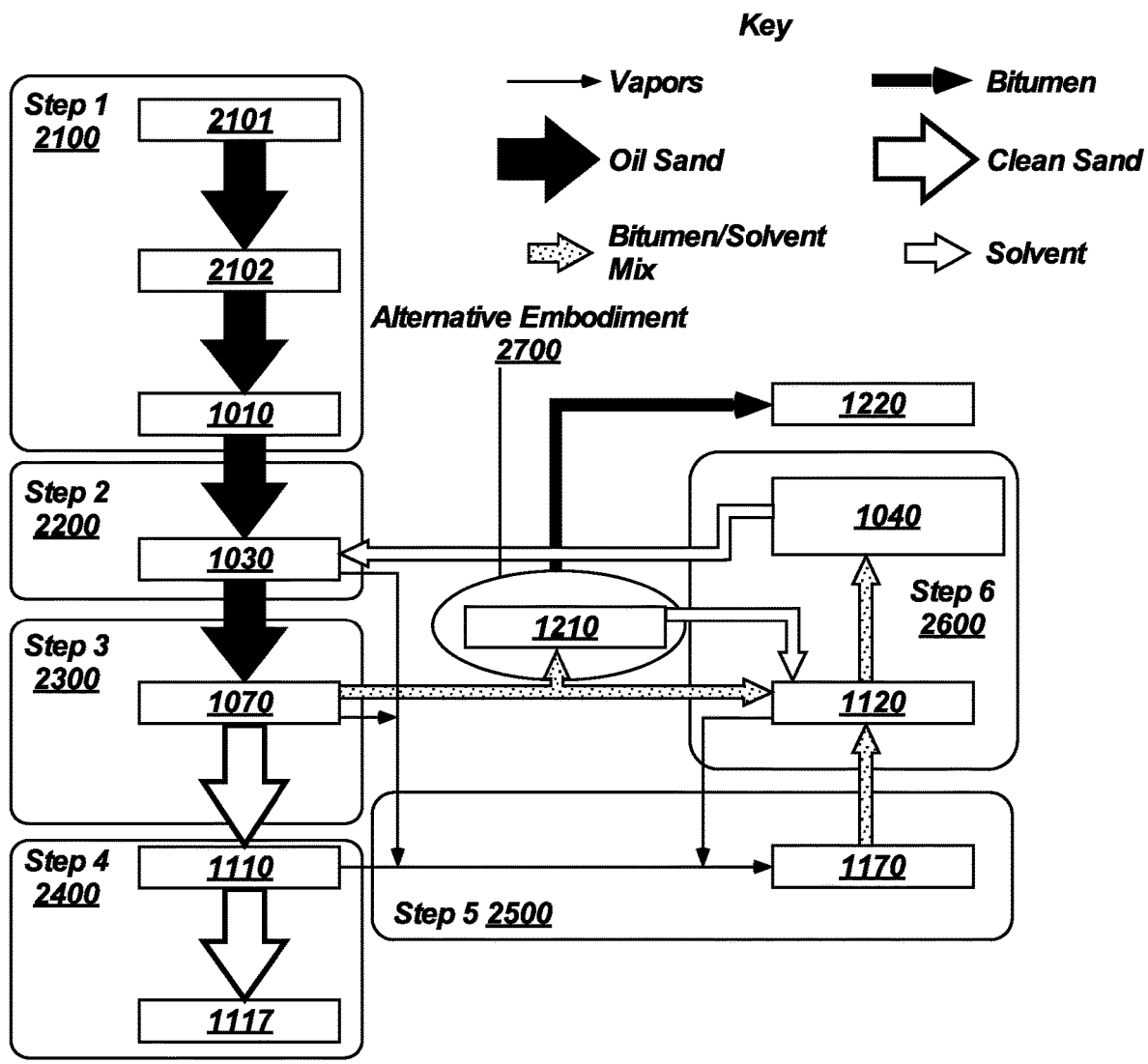
FIG. 2 is a flow chart showing the process for extracting bitumen from oil sands material.

Another illustrative embodiment provides a method of using the system described above to extract bitumen from oil sands material, as primarily shown in FIG. 2 with particular reference to FIG. 1 as well as other specified figures. The method will now be described in detail with reference to the figures.

Figure 6:
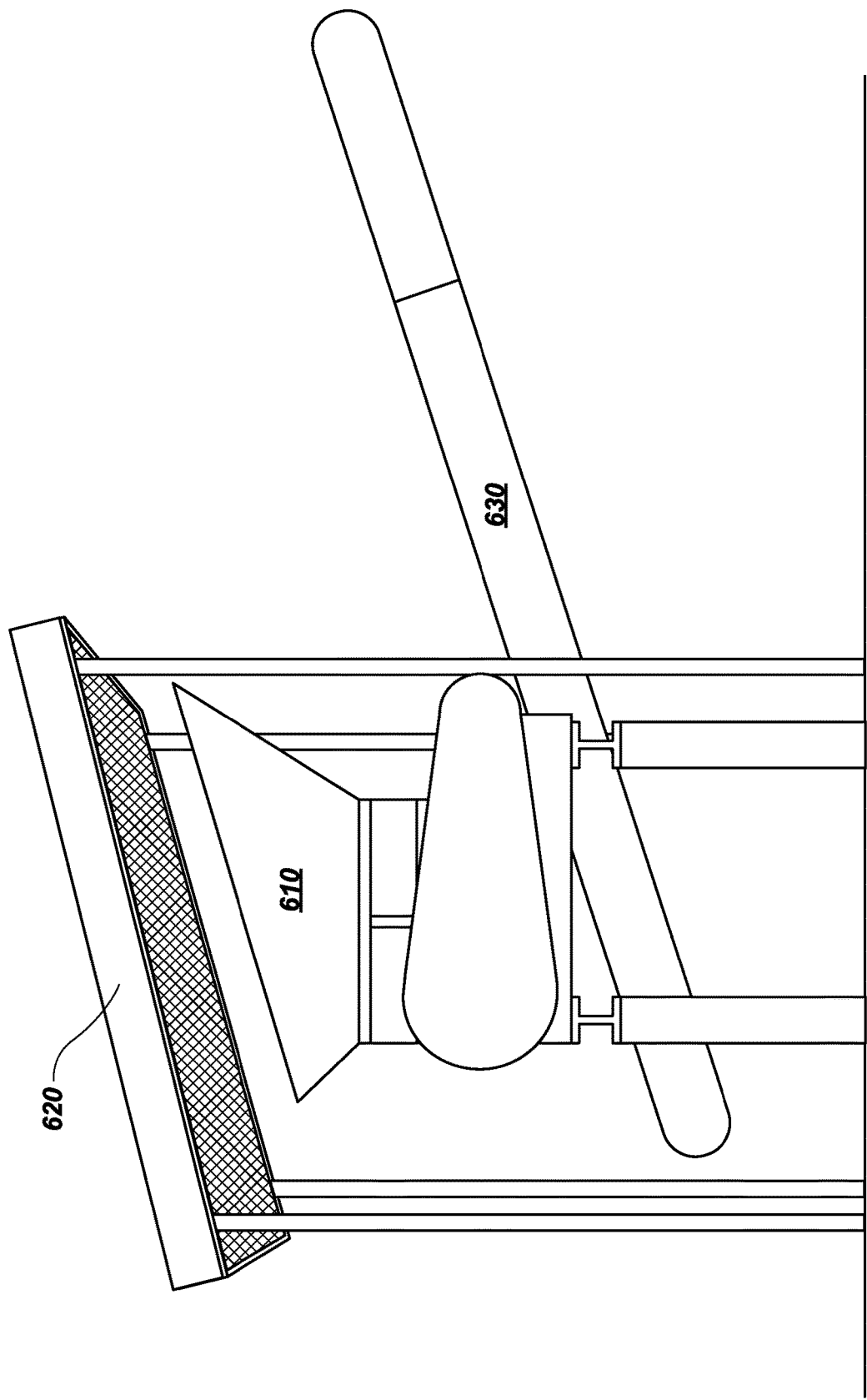
FIG. 6 is a view of an illustrative clay feeder.

In the first step of the illustrative method, as represented in FIG. 2 at 2100, mined oil sand material is excavated 2101 and ground 2102 into small pieces which are fed into a clay feeder 1010 (also represented in FIG. 1 and in FIG. 6). The clay feeder has a grizzly bar and/or screen attached to the top that will filter out any material larger than a certain size. This size can vary depending upon the embodiment, but in one embodiment the filter removes any material which is preferably than 1 inch in diameter. The clay feeder has rotary blades that will force the material out to one side and ultimately drop it onto a conveyor (1020 in FIG. 1). The conveyor is controlled by a central electrical panel (represented in FIG. 3), and has a variable frequency drive that can vary the speed of the motor, thus allowing control of the flow of material onto the conveyor. In an illustrative embodiment of this method the central electrical panel controls all parts of the process and does so at a speed such that the process is continuous.

In the second step of the process 2200, material exits the clay feeder 1010 and is dropped onto a moving conveyor belt 1020, which transports the material to the top of a mix tank 1030 (also represented in FIG. 1 and FIG. 7), where it is mixed with a hydrocarbon solvent from a hydrocarbon tank (1040 in FIG. 1). The mix tank 1030 has a hopper (1031 in FIG. 1) and rotary valve (1032 in FIG. 1) mounted on it. The conveyor 1020 includes a weigh belt, as known to those of skill in the art, that measures the exact amount of material traveling along the conveyor. The conveyor can also be powered by a variable speed motor, controlled by the central electrical panel, shown in FIG. 3, which allows the amount of material dropped in the mix tank to be adjusted as needed. The weigh belt scale and data is housed on a portion of the skid for the operator to observe (as illustrated in FIG. 4). The top portion of the hopper 1031 makes light contact with the belt 1020 as it passes, to prevent any oil sand material from sticking to the belt and traveling along the underside. As material falls into the hopper 1031, a rotary valve 1032 is spinning to allow material into the mix tank and also prevent any air inflow into the mix tank 1030.

Figure 3:
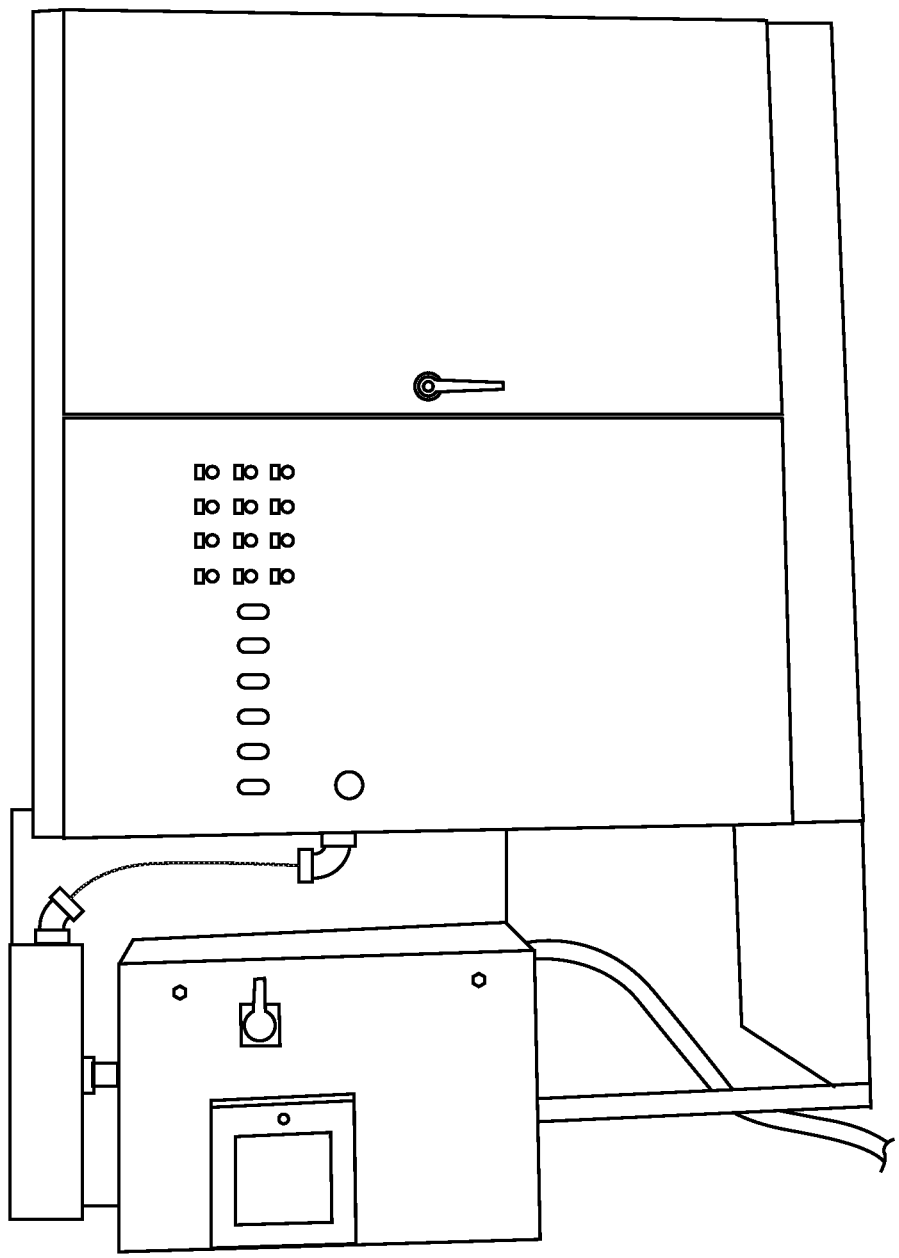
FIG. 3 is a view of the central control panel of an illustrative apparatus.
Figure 4:
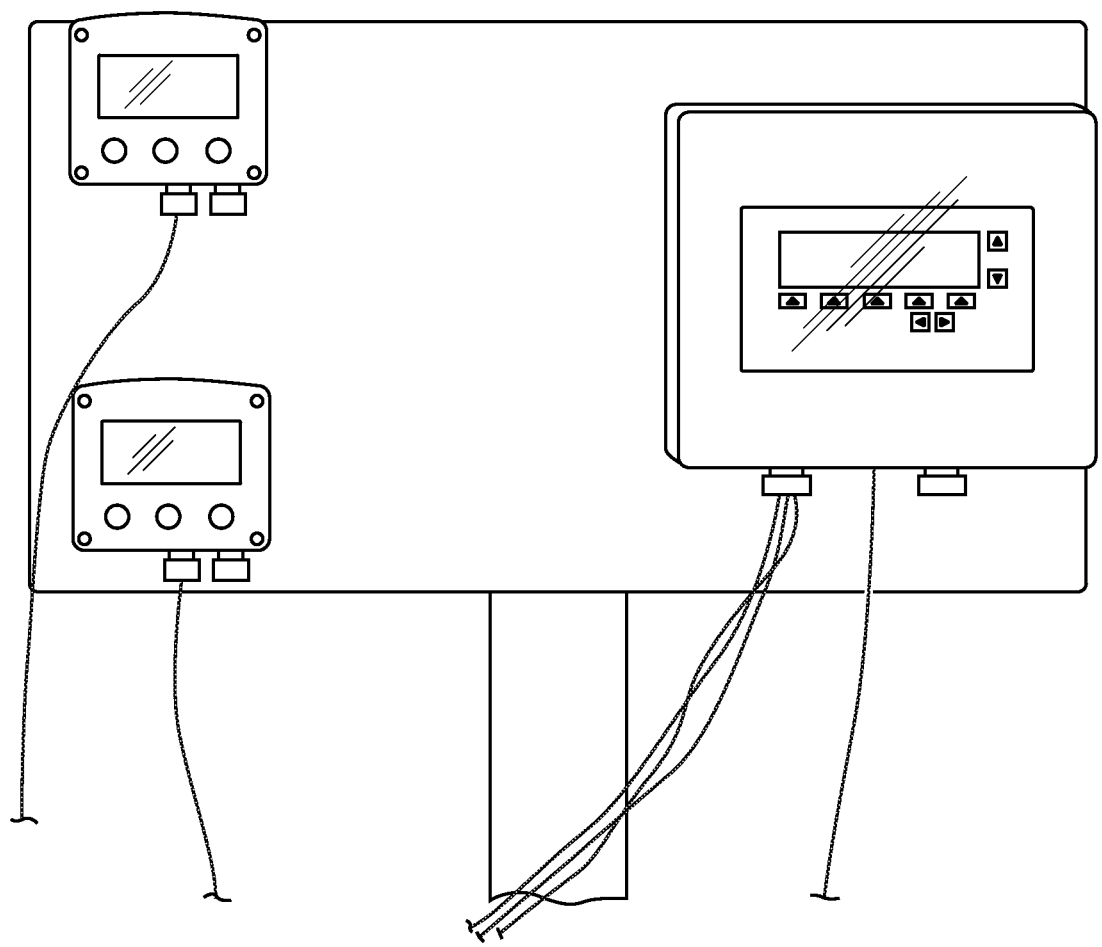
FIG. 4 is a view of the data panel which shows data on the operation of an illustrative apparatus.

Also included in the second illustrative step of the process, an agitator inside the mix tank 1030 spins, controlled by the central panel (as represented in FIG. 3). In addition, when the level of material in the mix tank 1030 is low, a series of float switches that detect the level and will activate a pump (1220 in FIG. 1) that introduces more solvent into the mix tank. In one illustrative embodiment of the invention the solvent is introduced from at least one hydrocarbon tank 1040, that is nearby situated within a containment ring 1050. As the mixture within the mix tank is agitated, the bitumen is separated from the particles of sand, resulting in a slurry of separating oil sands and a mixture of bitumen and a condensate of higher API hydrocarbons.

Figure 8:
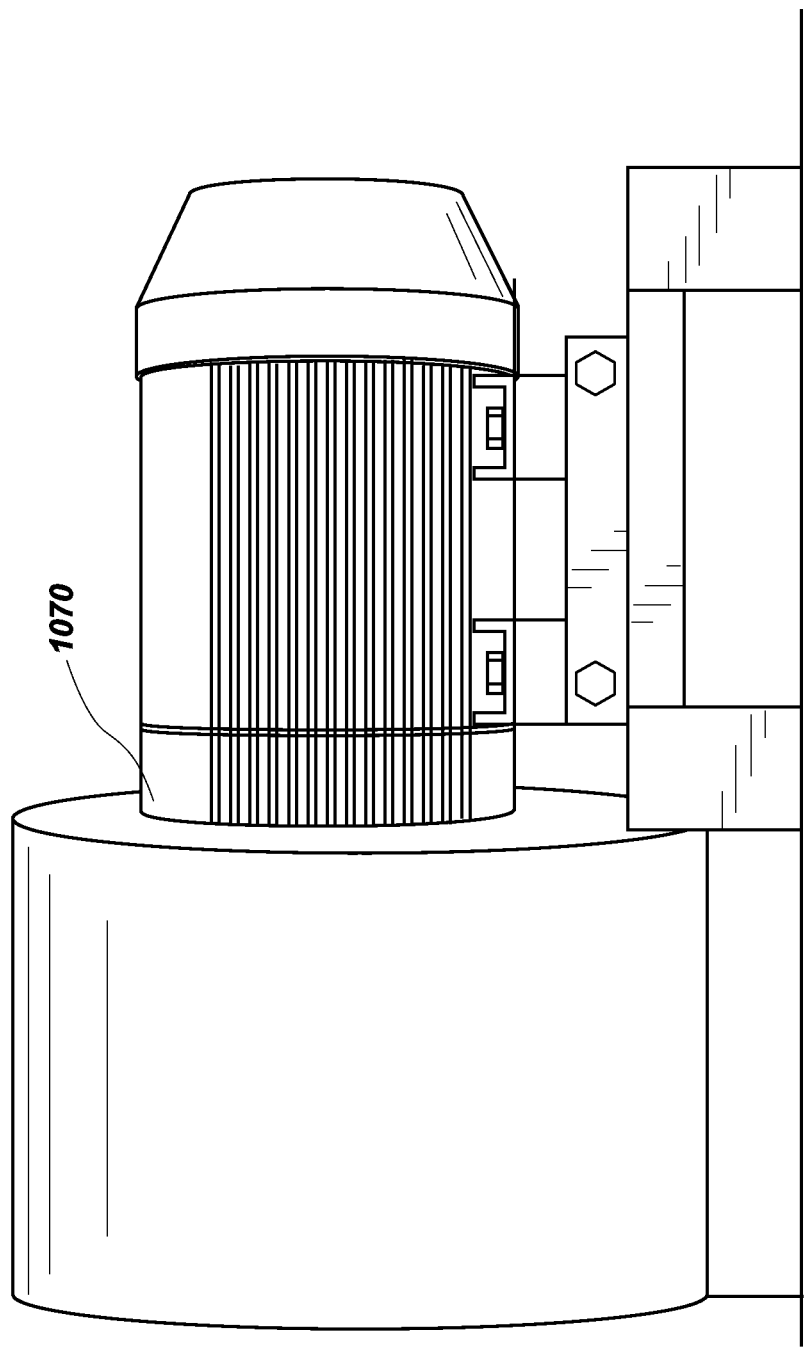
FIG. 8 is a view of an illustrative centrifuge.

In the third illustrative step of the method, 2300, a high-powered sand pump/slurry pump (1060 in FIG. 1) removes the slurry from the mix tank and pumps it into a centrifuge 1070 (also represented in FIG. 1 and FIG. 8). In one illustrative embodiment of the process the sand pump is controlled by a variable drive connected to it which is controlled from the main panel (also represented in FIG. 3) and can vary the speed of the motor and the rate of flow as needed to keep a continuous process. The centrifuge 1070 spins and separates sands that have had most of the bitumen embedded in them removed from the liquid combination of bitumen and condensate. Sands exit the centrifuge and fall into a cylindrical drying unit 1110 (also represented in FIG. 1), while the mix of bitumen and condensate liquid leave the centrifuge into a collection tank 1120 (also represented in FIG. 1). This results in a mixture of bitumen and a condensate of higher API hydrocarbons. In one illustrative embodiment the mixture of bitumen and condensate is fed into the collection tank 1120 by gravity.

In the fourth illustrative step of the method 2400, the cylindrical drying unit 1110 is heated by an Electrical Heat Tracing system (1115 in FIG. 1) to between approximately 150 degrees Fahrenheit and 300 degrees Fahrenheit. A series of rotary blades within the drying unit turn the sands over and ultimately deposit the clean sand into a spoils pile 1117 (also represented in FIG. 1) for ultimate removal and reclaiming back into the mine site pursuant to the mining plan (or to be sold as byproduct material for a few identified uses). As sands are exiting the centrifuge there may be some condensate or solvent material left on the sands, but as the sands make their way through the drying unit 1110, the condensate or solvent remaining on the sands turn into vapors that are sucked out of the drying unit through a hose (1130 in FIG. 1) placed at the top end of the drying unit. At the end of this process the sand contains less than 1% Total Petroleum Hydrocarbons. Continuous suction is created in the hose line (1145 in FIG. 1) by a vacuum pump (1140 in FIG. 1).

In the fifth illustrative step of the method, 2500, vapors from the drying unit 1110, the mix tank 1130, the centrifuge 1070, and the collection tank 1120 are collected by a series of hoses connected to the top of the various tanks (1130, 1150, 1160, 1175 in FIG. 1). These vapors are passed through a condensing unit 1170 (also represented in FIG. 1 and in FIG. 9). The condensing unit 1170 is chilled by a water chiller (1177 in FIG. 1), and the vapors condense into a liquid light end hydrocarbon, which is gravity fed into the collection tank 1120. Exhaust exits the system through a charcoal screen filter (1180 in FIG. 1) and an exhaust pipe (1190 in FIG. 1).

In the sixth illustrative step of this method, 2600, a series of float switches in the collection tank 1120 detects when the liquids reach a certain level and automatically activate a pump (1190 in FIG. 1). The pump removes material from the collection tank 1120 and in one illustrative embodiment deposits the material into at least one hydrocarbon/solvent tank 1040 within the containment ring 1050. This tank can be the same tank which feeds solvent into the mix tank, thus allowing the collected condensate material to be recycled in the process a number of times. In one illustrative embodiment the hydrocarbon tank has a capacity of approximately 400 barrels.

In another embodiment represented at 2700 in FIG. 2, after leaving the centrifuge, the bitumen and condensate mix passes through a flash evaporator 1210 (also shown in FIG. 1) which heats the mixture of bitumen and condensate. The flash evaporator removes the condensate, which is fed into a separate collection tank and then is fed into the hydrocarbon tank 1040 within the containment ring 1050. The remaining bitumen is fed into a production tank 1220 within the containment ring 1050, where it is maintained at the proper temperature for the bitumen to be stored or transported.

In view of the foregoing, it will be appreciated that the present disclosure provides an improved method and system for extracting bitumen from oil sands material. The method can produce either a mixture of bitumen and condensate, as to make crude oil, or it can separate the condensate and reuse it, leaving only bitumen, as for an asphalt binder. As will be appreciated by those of ordinary skill in the art, the present illustrative method improves the extraction of bitumen from oil sands material by providing a novel and efficient method for doing so. The method in the current disclosure provides an improvement by providing an efficient means for extracting bitumen.

In the foregoing Detailed Description, various features of the present disclosure are grouped together in single embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of any single foregoing disclosed embodiment. Thus, the following claims are hereby incorporated into this Detailed Description by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in quantities, proportions, materials, and manner of making and use may be made without departing from the principles and concepts set forth herein.

What is claimed is:

1. A system for extracting bitumen from oil sands material, comprising:
    a mix tank that receives oil sands material consisting of sand that is contaminated with bitumen and mixes the oil sands material with a hydrocarbon solvent to form a first mixture of oil sands material and hydrocarbon solvent;
    a centrifuge that receives the first mixture from the mix tank and spins to thereby separate the first mixture into clean sand and a second mixture of bitumen and hydrocarbon solvent;
    a drying unit that receives the clean sand from the centrifuge, the drying unit being configured to collect residual hydrocarbon solvent from the clean sand;
    a flash evaporator that receives the second mixture from the centrifuge and separates the second mixture into hydrocarbon solvent and bitumen; and
    a hydrocarbon solvent tank that receives the hydrocarbon solvent after the hydrocarbon solvent has been separated from the bitumen, the hydrocarbon solvent tank providing the hydrocarbon solvent to the mix tank for use in forming the first mixture.

2. The system of claim 1, further comprising:
    a clay feeder that receives the oil sands material; and
    a conveyor belt that transports the oil sands material from the clay feeder to the mix tank.

3. The system of claim 1, further comprising:
    a sand pump that pumps that first mixture from the mix tank into the centrifuge.

4. The system of claim 3, wherein the sand pump is connected to the mix tank via a main hose line that is positioned 22 inches from a bottom of the mix tank.

5. The system of claim 4, wherein the sand pump is also connected to the mix tank via a bypass line that is positioned towards a top of the mix tank.

6. The system of claim 1, wherein the mix tank includes an agitator that mixes the oil sands material with the hydrocarbon solvent to form the first mixture.

7. The system of claim 6, wherein the agitator comprises at least one stirring blade.

8. The system of claim 1, wherein the drying unit includes a series of rotary blades.

9. The system of claim 8, wherein the drying unit includes a heating system for heating the clean sand to cause the residual hydrocarbon solvent in the clean sand to be vaporized.

10. The system of claim 1, further comprising:
    a production tank in which the bitumen is stored after the bitumen is separated from the hydrocarbon solvent.

11. The system of claim 1, further comprising:
    a condensing unit that receives vapors of the hydrocarbon solvent from the mix tank and the centrifuge, condenses the vapors to form hydrocarbon solvent and then provides the hydrocarbon solvent to the hydrocarbon solvent tank.

12. The system of claim 11, wherein the condensing unit also receives vapors of the hydrocarbon solvent from the drying unit.

13. The system of claim 12, further comprising:
    a collection tank that receives the hydrocarbon solvent from the condensing unit; and a pump that pumps the hydrocarbon solvent from the collection tank to the hydrocarbon solvent tank.

14. The system of claim 13, wherein the collection tank also receives the hydrocarbon solvent from the flash evaporator.

15. The system of claim 13, wherein the collection tank includes at least one float switch that when activated causes the pump to pump the hydrocarbon solvent from the collection tank to the hydrocarbon solvent tank.

16. The system of claim 12, further comprising:
a vacuum pump that causes the vapors of the hydrocarbon solvent to flow from the mix tank, the centrifuge and the drying unit into the condensing unit.

17. A system for extracting bitumen from oil sands material, comprising:
a hydrocarbon solvent tank that stores hydrocarbon solvent;
a mix tank that receives oil sands material consisting of sand that is contaminated with bitumen and also receives the hydrocarbon solvent from the hydrocarbon solvent tank, the mix tank mixing the oil sands material with the hydrocarbon solvent to form a first mixture of oil sands material and hydrocarbon solvent;
a centrifuge that receives the first mixture from the mix tank and separates the first mixture into clean sand and a second mixture of bitumen and hydrocarbon solvent;
a flash evaporator that receives the second mixture from the centrifuge and separates the second mixture into hydrocarbon solvent and bitumen; and
a drying unit that includes a heating system for heating the clean sand to cause residual hydrocarbon solvent in the clean sand to be vaporized;
wherein the hydrocarbon solvent tank receives the hydrocarbon solvent after the hydrocarbon solvent has been separated from the bitumen such that the hydrocarbon solvent is recycled within the system.

18. The system of claim 17, further comprising:
a condensing unit that receives vapors of the hydrocarbon solvent from the drying unit, condenses the vapors to form hydrocarbon solvent and then provides the hydrocarbon solvent to the hydrocarbon solvent tank.

19. The system of claim 18, further comprising:
a collection tank that receives the hydrocarbon solvent from the condensing unit; and
a pump that pumps the hydrocarbon solvent from the collection tank to the hydrocarbon solvent tank.

20. The system of claim 19, wherein the collection tank also receives the hydrocarbon solvent from the flash evaporator.

21. The system of claim 20, further comprising:
a production tank that receives the bitumen from the flash evaporator.

22. The system of claim 17, further comprising:
a clay feeder that receives the oil sands material; and
a conveyor belt that transports the oil sands material from the clay feeder to the mix tank.

23. The system of claim 17, further comprising:
a pump that pumps the hydrocarbon solvent from the hydrocarbon solvent tank into the mix tank.

24. The system of claim 17, wherein the mix tank includes an agitator that mixes the oil sands material with the hydrocarbon solvent to form the first mixture.

25. The system of claim 17, further comprising:
a sand pump that pumps that first mixture from the mix tank into the centrifuge.

26. The system of claim 25, wherein the sand pump is connected to the mix tank via a main hose line that is positioned towards a bottom of the mix tank.

27. The system of claim 26, wherein the sand pump is also connected to the mix tank via a bypass line that is positioned towards a top of the mix tank.

28. The system of claim 17, further comprising:
a clay feeder that receives the oil sands material;
a conveyor belt that transports the oil sands material from the clay feeder to the mix tank; and
a condensing unit that receives vapors of the hydrocarbon solvent from the mix tank, the centrifuge and the drying unit, condenses the vapors to form hydrocarbon solvent and then provides the hydrocarbon solvent to the hydrocarbon solvent tank.

29. The system of claim 28, further comprising:
a collection tank that receives the hydrocarbon solvent from the condensing unit; and
a pump that pumps the hydrocarbon solvent from the collection tank to the hydrocarbon solvent tank.

30. The system of claim 17, further comprising:
a condensing unit that receives vapors of the hydrocarbon solvent from the mix tank, the centrifuge and the drying unit, condenses the vapors to form hydrocarbon solvent and then provides the hydrocarbon solvent to a collection tank; and
a pump that pumps the hydrocarbon solvent from the collection tank to the hydrocarbon solvent tank.

* * * * *